(12) United States Patent
Lin et al.

(10) Patent No.: US 7,301,601 B2
(45) Date of Patent: Nov. 27, 2007

(54) OPTICAL SWITCHING DEVICE USING HOLOGRAPHIC POLYMER DISPERSED LIQUID CRYSTALS

(75) Inventors: Jibing Lin, Fremont, CA (US); Suning Tang, Fremont, CA (US); Yuanji Tang, Palo Alto, CA (US); Masami Aihara, San Jose, CA (US)

(73) Assignee: Alps Electric (USA) Inc., Campbell, CA (US)

( * ) Notice: Subject to any disclaimer, the term of this patent is extended or adjusted under 35 U.S.C. 154(b) by 102 days.

(21) Appl. No.: 10/850,714

(22) Filed: May 20, 2004

(65) Prior Publication Data

US 2005/0259217 A1    Nov. 24, 2005

(51) Int. Cl.
  *G02F 1/13*   (2006.01)
  *G02F 1/1335* (2006.01)

(52) U.S. Cl. .............. 349/201; 349/61; 349/114; 359/253

(58) Field of Classification Search ............. 349/61, 349/114, 201
See application file for complete search history.

(56) References Cited

U.S. PATENT DOCUMENTS

| | | | |
|---|---|---|---|
| 5,243,455 A | 9/1993 | Johnson et al. | |
| 5,594,560 A * | 1/1997 | Jelley et al. | 359/15 |
| 6,111,633 A | 8/2000 | Albert et al. | |
| 6,172,792 B1 * | 1/2001 | Jepsen et al. | 359/254 |
| 6,317,189 B1 | 11/2001 | Yuan et al. | |
| 6,317,228 B2 * | 11/2001 | Popovich et al. | 359/15 |
| 6,398,981 B1 * | 6/2002 | Galstian et al. | 252/299.01 |
| 6,407,785 B1 | 6/2002 | Yamazaki | |
| 6,574,487 B1 | 6/2003 | Smith et al. | |
| 6,621,533 B2 | 9/2003 | Slack et al. | |
| 6,646,636 B1 * | 11/2003 | Popovich et al. | 345/204 |
| 6,697,133 B2 | 2/2004 | Fan et al. | |
| 6,707,518 B1 | 3/2004 | Cowan | |
| 6,721,030 B2 | 4/2004 | Hsieh et al. | |
| 2003/0016314 A1 | 1/2003 | Dong et al. | |
| 2003/0027511 A1 | 2/2003 | Doe | |
| 2003/0053015 A1 * | 3/2003 | Minoura et al. | 349/113 |
| 2003/0058400 A1 | 3/2003 | Zhuang et al. | |
| 2003/0085377 A1 | 5/2003 | Dunn et al. | |
| 2003/0147257 A1 | 8/2003 | Lee | |
| 2003/0180022 A1 | 9/2003 | Kimura | |
| 2003/0231268 A1 | 12/2003 | Chen et al. | |
| 2003/0231394 A1 | 12/2003 | Kimura | |

OTHER PUBLICATIONS

Yan-qing Lu, Fang Du and Shin-Tson Wu, "*Polarization Switch Using Thick Holographic Polymer-Dispersed Liquid Crystal Grating,*" Journal of Applied Physics, vol. 95 No. 3, pp. 8110-815, Feb. 1, 2004.

* cited by examiner

*Primary Examiner*—Michael H. Caley
(74) *Attorney, Agent, or Firm*—Brinks Hofer Gilson & Lione (57) ABSTRACT

A thin holographic optical switch used in a liquid crystal display device contains opposing transparent substrates transparent electrodes between the substrates and a diffraction grating between the electrodes. The diffraction grating contains regions of transparent polymerized photopolymers and cholesteric liquid crystal micro-droplets. Refractive indexes of the photopolymers and liquid crystal are substantially the same when the electrodes have the same potential. The holographic optical switch transmits broadband LED light when the potential difference between the electrodes is zero and is polarization independent. The holographic optical switch diffracts broadband LED light when the potential difference between the electrodes is non-zero and is polarization independent.

35 Claims, 10 Drawing Sheets

Fig. 5(b) Reflection hologram

Fig. 5(a) Transmission hologram

Figure 6(a)  Figure 6(b)

Prior Art

OPTICAL SWITCHING DEVICE USING HOLOGRAPHIC POLYMER DISPERSED LIQUID CRYSTALS

BACKGROUND

This invention is related generally to an optical device that can switch the direction of impinging light. More particularly, the present invention is related to a holographic optical switch containing polymer dispersed liquid crystals in liquid crystal displays and other electronics.

Liquid crystal display devices (LCD) have many advantages over other types of displays. LCDs provide high picture quality in a small volume and are lightweight. In addition, LCDs have comparatively low power consumption, which is dependent on the type of LCD. This has caused the portable electronic market to focus on LCD use for such applications as small portable televisions, mobile telephones and other communication products, video recording units, notebook computers, and desktop monitors.

Active LCDs, which are the most common LCDs in use, contain substrates, a liquid crystal layer through which light passes, and a pixel electrode on one of the substrates that supplies an electric field to liquid crystal layer to form a light guide panel. The metal used to fabricate the pixel electrode depends on the type of LCD used. Reflective LCDs use a natural or artificial light source located outside the LCD and thus the material used for the pixel electrodes has to be a reflective conductive material such as metal aluminum. However, if the external light intensity is not strong enough, the image displayed by the reflective LCD is poor.

To combat this problem, an intrinsic light source generally called a backlight is added to the liquid guide panel. The backlight is supplied to the liquid crystal layer from a fluorescent lamp, light emitting diode (LED), or electroluminescent diode (EL). The backlight is located behind the display requiring the material used for the pixel electrodes has to be a transparent conductive material such as indium tin oxide (ITO). However, besides increasing the size of the LCD (and adding weight and cost), the backlight also consumes the most power in the LCD, severely decreasing battery life if constantly used.

Decreasing the power consumption has thus been a prominent source of research, leading to the developments of the transflective LCD. In transflective LCDs, the pixel electrodes are usually a combination of aluminum in one location and ITO in another location. This permits external light to be used as the light source when the external light is of high enough intensity to provide a good image and the backlight to be used as the light source when the external light is not of high enough intensity. However, the area in which images can be displayed is reduced in both the transmittance and reflectance modes in a transflective LCD.

Polymer dispersed liquid crystal (PDLC) layers have been used for switching in optical fiber communication applications. In a few applications, PDLC layers have been used in transflective LCDs to increase the display area. PDLC is a photoelectric material that transmits light through the material when a voltage is applied to the structure and renders the structure relatively opaque by scattering the incident light when no voltage is applied. PDLC is a mixture of monomers or oligomers with liquid crystal molecules, and then polymerizing the monomers/oligomers to form a polymer. The liquid crystal molecules aggregate to form micro-droplets and are dispersed in the polymer matrix under certain conditions. The PDLC layer is placed directly below the liquid crystal panel between the backlight and the liquid crystal panel so that, in the reflectance mode when no voltage is applied to the PDLC layer external light is scattered and the liquid crystal display is illuminated and, in the transmission mode when a voltage is applied to the PDLC layer, the PDLC is transparent and allows light from the backlight (which extends over the surface area) directly there beneath to illuminate the liquid crystal layer.

In other transflective LCDs, however, the backlight not directly below the liquid crystal panel. Instead, the backlight is adjacent to a light guide layer beneath the liquid crystal layer. The light guide layer guides light into the liquid crystal layer. PDLC layers have not been used with these structures. In addition, with the advent of more complicated technologies, there exist additional uses for light sources incorporated within transflective LCDs. One readily apparent example is the use of an internal light source to illuminate an area in front of the electronic device without the need for an additional light source. More particularly, for cellular telephones having cameras, the backlight can be used, for example, to illuminate a subject to be photographed and enable a viable picture or series of pictures to be taken. However, no structure or optical switch exists that provides this ability within the required tolerances of the small electronics, e.g. cost, size, weight, ruggedness, and minimal power consumption.

BRIEF SUMMARY

By way of introduction only, the present embodiments provide an optical switch that may be preferable to use in small electronic devices, in addition to being used elsewhere. The optical switch transmits light from a wideband light source such as a light emitting diode (LED) through the optical switch without application of a voltage to the switch without substantial attenuation over the entire wavelength range of the light source. The switch is compact enough to fit in a camera cellular phone, for example, without adding appreciable size and is light enough to not add noticeable weight. The switch is polarization independent, transmitting and diffracting light of both s and p polarizations without substantial loss. This is to say that materials in the switch that compensate for different polarization such that the switch affects both s and p polarizations of the light from the light source in substantially the same manner independent of a voltage applied to the switch. The switch is also non-mechanical inasmuch as no shutters or other components need be used, thereby affording application of a rugged component that is not easily misaligned or broken if the electronic device is dropped or otherwise subject to a physical shock.

The optical switch of one embodiment includes opposing substrates, electrodes disposed between the substrates, and a Bragg grating disposed between the electrodes. The Bragg grating contains regions of polymerized photopolymers and liquid crystal aggregates. Refractive indexes of the photopolymers and liquid crystals are substantially the same when the electrodes have the same potential.

A liquid crystal display device that includes the optical switch of one of the embodiments of the present invention also contains a liquid crystal display having opposing substrates, electrodes on the substrates, a liquid crystal layer between the electrodes, polarizers disposed on opposite sides of the substrates as the liquid crystal layer and a light guide disposed on one of the polarizers. An optical switch is disposed between the light guide and a light source. The optical switch contains opposing optical switch substrates, optical switch electrodes disposed between the optical switch substrates, and a Bragg grating disposed between the electrodes. The Bragg grating has regions of a polymerized photopolymer and liquid crystal aggregates and is substantially polarization independent.

In another embodiment, a method of manufacturing the liquid crystal device includes both placing an LED and a holographic polymer dispersed liquid crystal (HPDLC) adjacent to each other, and adjusting the HPDLC such that light from the light source that has entered the HPDLC is transmitted directly through the HPDLC without being substantially diffracted without a voltage being applied to the HPDLC.

In another embodiment, a method of manufacturing a holographic polymer dispersed liquid crystal (HPDLC includes: blending monomers and liquid crystals to form a mixture; filling the mixture into a cavity between two joined glass substrates; exposing the joined substrates to intersecting coherent radiation beams of sufficient intensity and for a sufficient amount of time to initiate polymerization in high intensity regions of an interference pattern and permit the liquid crystal to diffuse to the low intensity regions, saturate and precipitate aggregates, the phase separation, depending upon the concentration of liquid crystal and polymer; and flooding the exposed mixture with a beam of uniform radiation to surround the liquid crystal aggregates with a cured polymer matrix in which a refractive index of the aggregates is equal to a refractive index of the matrix without a voltage being applied to the flooded mixture.

The foregoing summary has been provided only by way of introduction. Nothing in this section should be taken as a limitation on the following claims, which define the scope of the invention.

BRIEF DESCRIPTION OF THE DRAWINGS

FIGS. 5(a) and 5(b) show a transmission and reflection optical switches, respectively.

DETAILED DESCRIPTION OF THE EMBODIMENTS

As described above, in transflective LCDs, the light from the light source is supplied to the LCD through the light guide layer and the transparent substrate of the LCD. Typically, no switch is provided between the light source and the liquid crystal panel. While a mechanical switch could be used, such a switch is relatively bulky and adds considerable weight to the device in which the LCD and switch is housed. Furthermore, the large increase in the size of the LCD, relative fragility (i.e. the switch may easily be broken, become dislodged or become misaligned if the device is dropped or otherwise subject to physical shocks), and large power/current requirements are severe detriments to the use of a mechanical switch. HPDLCs may be integrated in the device to provide switching and alleviate a number of problems. The present HPDLCs dramatically decrease the response time of the switch: a mechanical switch has a typical response time of 10-20 milliseconds, whereas the present HPDLC has a response time of 10 µs to 1-2 milliseconds, i.e. one to three orders of magnitude faster. As no moving parts exist in the HPDLC-based optical switch, time-to-failure is also much longer.

A number of problems exist when conventional HPDLCs are used. Although not exclusive, one notable problem is the inability of conventional HPDLCs to use the entire amount of light from the internal light source. This is to say that conventional HPDLCs are polarization dependent, thus for example, the amount of light transmitted through the conventional HPDLCs is immediately halved. Any arrangement in which the HPDLC is arranged between a light source and a light guide panel immediately uses only one half of the light and accordingly requires a greater amount of power to be used to equal the amount of light impinging on the light guide without the conventional HPDLC.

Also, with the ever-increasing requirement of shrinking the thickness of electronic devices, especially portable devices, adding another multiple layer element to the liquid crystal panel is relatively undesirable. Thus, although a HPDLC can be placed between the light source and light guide so that the liquid crystal display includes the liquid crystal panel, light guide, HPDLC, light source and opaque reflector below the light source to reflect light from the light source back towards the HPDLC, other embodiments may be more suitable for miniaturized electronics.

Figure 4A:
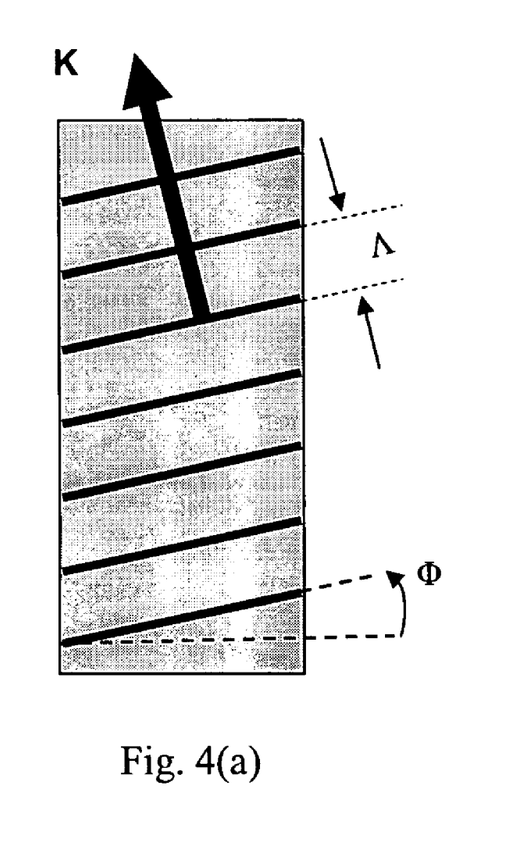
FIGS. 4(a) and 4(b) show detailed grating structures and design parameters.
Figure 4B:
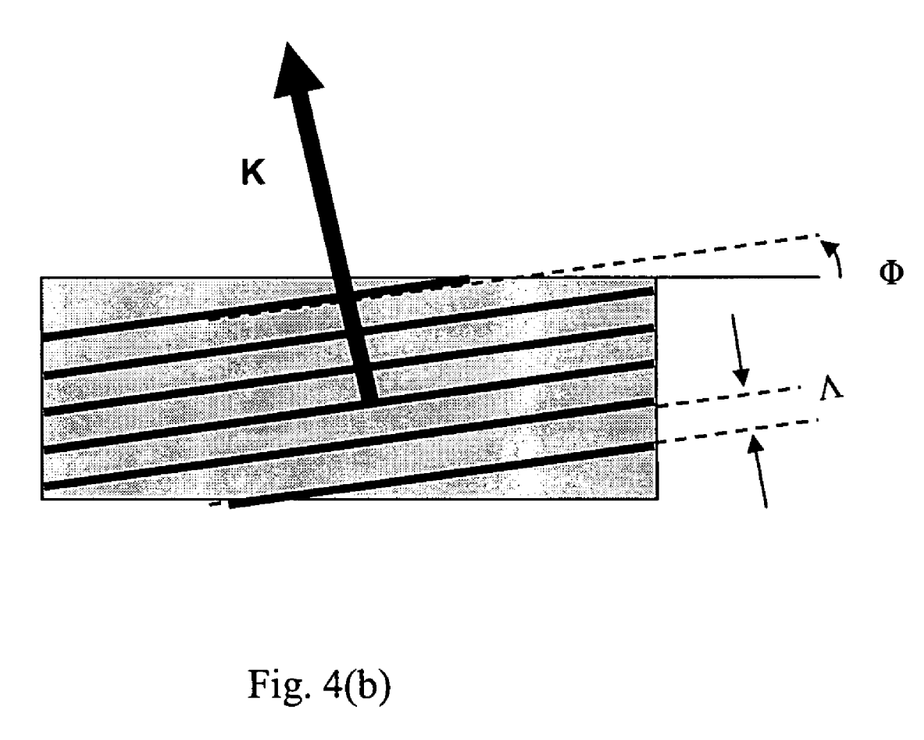

In one such embodiment, the HPDLC is disposed adjacent to the light guide as shown and described below in FIG. 4. In other words, the HPDLC is disposed laterally near an end of the light guide rather than under the light guide. The former arrangement will be referred to hereinafter as an end mounted HPDLC while the latter arrangement will be referred to as a surface mounted HPDLC. This decreases the thickness of the structure and permits a HPDLC to be used without substantially (if at all) increasing the size of the overall device due to other electronic components being placed in a similar fashion nearby. Such a structure also permits the diverted light to be used elsewhere if desired.

However, using conventional HPDLCs still engender the polarization problem above. Also, the inability of conventional HPDLCs to transmit light directly through the optical switch without application of a voltage is problematic. This is to say that conventional HPDLCs transmit only when voltages of a several volts or greater (typically between 1 and 20 V) are applied to the HPDLC. Thus, with an end mounted light source-PDLC, a large amount of power is consumed to put the optical switch in the transmission state, which is the normal operating state of the device.

Figure 9A:
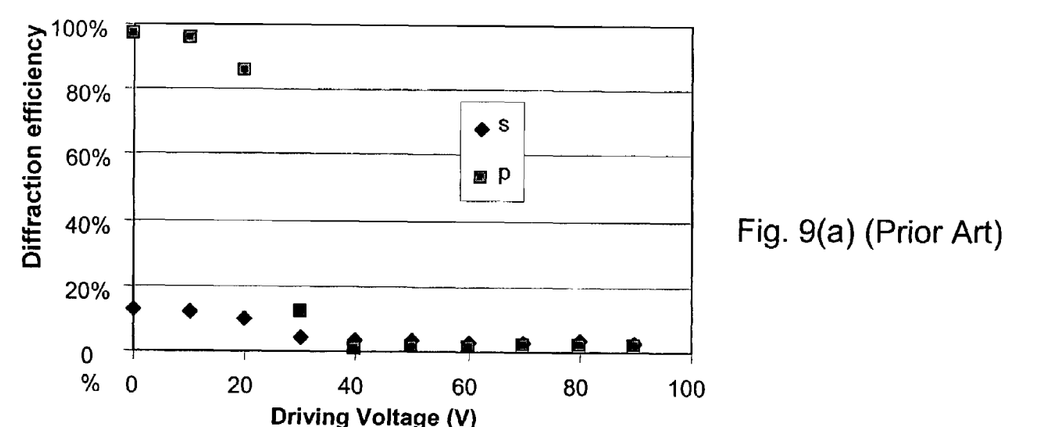
FIGS. 9(a), 9(b), and 9(c) show diffraction efficiencies vs. applied voltages for a conventional HPDLC, and HPDLCs according to embodiments of the present invention.

One example of such a conventional HPDLC is shown in FIG. 9(a), in which the response of the grating is dependent on the polarization. As can be seen, the diffraction efficiency decreases from about 15% to under 5% for s polarized laser light of 442 nm as the applied voltage increases from 0V to 40 V. In the same voltage range, however, the diffraction efficiency for p polarized light decreases from close to 100% to almost 0%. In other words, the transmission efficiency for the conventional HPDLC increases from 85% to over 95% and from 0% to almost 100% for s and p polarized light, respectively, and thus requires a relatively large voltage to be applied for transmission of both polarizations.

Using the HPDLCs disclosed herein, an optical switch that is mechanically stable and uses low power can be formed. The holographic optical switch is ideal for use in portable electronics or other devices in which a thin, low power switch is desired. For example, such an optical switch may be used to provide an additional light source for a camera cell phone, thereby enabling relatively short distance pictures to be taken without using an external light source. Appropriate selection of the photopolymer matrix and liquid crystals enclosed therein as well as the grating dimensions, permit the transmission through the switch to be maximized without applying a voltage to the structure while simultaneously affording a substantially polarization independent switch. This permits light from a wideband light source such as an LED to be used in the liquid crystal display. Light may be coupled into the light panel relatively easily in the edge structure disclosed. The gratings disclosed herein are relatively thin, being under 10 μm thick, and more typically 2-4 μm to provide a relatively wide passband (enough to adequately transmit light from the light source without substantial attenuation, e.g. of at least about 100 μm at 10% of the maximum transmission) while having a significant diffraction efficiency at the desired applied voltage.

Figure 1:
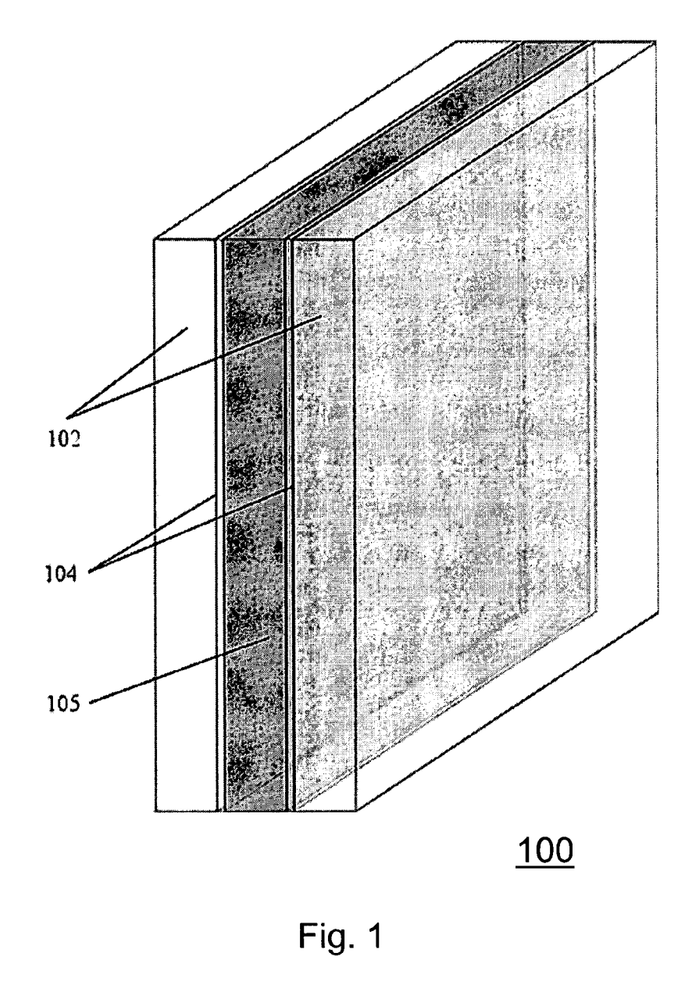
FIG. 1 illustrates an embodiment of the present invention.

Holographic polymer dispersed liquid crystals (HPDLCs) are optical devices formed by recording a Bragg grating (also known as a volume phase grating, a hologram or holographic grating, or diffraction grating) in a polymer dispersed liquid crystal mixture. As shown in FIG. 1, a HPDLC device 100 is fabricated by taking two parallel substrates 102 whose sides are sealed and filling the cavity formed by the combination with a mixture of photopolymers and liquid crystal materials 106, similar to a fabrication process for the liquid crystal panel in a liquid crystal display. The substrates 102 may be uniformly spaced using spacers (not shown) such as spherical insertions or prismatic projections.

The substrates 102 can be formed of glass or other material that is substantially transparent to a particular wavelength range, such as the visible wavelength range from about 400 nm to about 800 nm. The substrates 102 may be coated with an anti-reflection coating to improve transmittance to greater than 99% at the particular wavelength range of interest.

Examples of one or more glasses that may form the substrates 102 include BK7, FK51, LAK6, with the particular glass having very little effect on the results of the switching. Other materials that may be used as a substitute for or in addition to glass, for example, include quartz or plastic. Types of plastic substrates include, for example, polyester, such as polyethyleneterephthalate (PET), or of polyvinylalcohol (PVA), polycarbonate (PC) or triacetylcellulose (TAC). A birefringent substrate, for example, a uniaxially stretched plastic film can also be used. The substrate may be covered with a rubbed polyimide. The use of a birefringent substrate or rubbed polyimide may decrease the polarization dependence of the optical switch. If using a polymerizable material as the thin layer 106, the substrate may or may not be removed after polymerization. If the substrate is not removed from the polymerized film after polymerization, an isotropic substrate may be used.

One or both substrates support transparent electrodes 104. The electrodes 104 may be formed from any of a wide variety of transparent films, such as indium tin oxide or indium zinc oxide films. A voltage may be supplied across the electrodes 104 to apply an electric field across the HPDLC layer 106.

To fabricate the grating 100, as above a polymerizable liquid crystal material 106 is filled into the space between two substrates containing the transparent electrode 104 and the liquid crystal material is aligned into a uniform orientation. The orientation of liquid crystal material can then be permanently fixed by the formed solid polymer structure.

Polymerization of the polymerizable liquid crystal material is achieved, for example, by exposure to coherent radiation. Lasers are commonly used as the irradiation source. UV, visible or IR wavelengths may be used, as may X-rays, gamma rays or other high energy particles, for example, ions or electrons. Thus, the radiation may be photolithography radiation, i.e. radiation used in standard photolithographic processes, which may include exposure through a phase mask. Depending on the application and formulation, the mixture may additionally include photo-initiators, surfactants, and other components. If a photo-initiator is present, the photo-initiator will absorb at the wavelength of the radiation when polymerizing. For example, when polymerizing using a UV laser, one or more photo-initiators can be used that decomposes under UV irradiation to produce free radicals or ions that start the polymerization reaction. Examples of commercially available photo-initiators include Irgacure 651, Irgacure 184, Darocure 1173 or Darocure 4265 (all from Ciba Geigy AG) or UVI 6974 (Union Carbide). In all, the total composition of the mixture usually includes about 0.01 to 10% by weight of the photo-initiator.

The curing time depends on the reactivity of the polymerizable material, the thickness of the coated layer, the type of polymerization initiator and the power of the radiation source. The curing time may be as short as possible if a high throughput process is desired. Generally, the curing time is no longer than several minutes.

In addition to polymerization initiators the polymerizable material may also comprise one or more other suitable components, for example, catalysts, stabilizers, chain-transfer agents or co-reacting monomers. In particular the addition of stabilizers may prevent undesired spontaneous polymerization of the polymerizable material, for example, during storage.

As stabilizers all compounds can be used that are known to the skilled in the art for this purpose. These compounds are commercially available in a broad variety. Typical examples for stabilizers are 4-ethoxyphenol or butylated hydroxytoluene (BHT).

Other additives, for example, chain transfer agents, can also be added to the polymerizable material in order to modify the physical properties of the polymer film. When adding a chain transfer agent, such as a monofunctional thiol compound like dodecane thiol, or a multifunctional thiol compound like trimethylpropane tri(3-mercaptopropionate), to the polymerizable material, the length of the free polymer chains and/or the length of the polymer chains between two crosslinks in the inventive polymer film can be controlled. When the amount of the chain transfer agent is increased, the polymer chain length in the obtained polymer film decreases.

Figure 2:
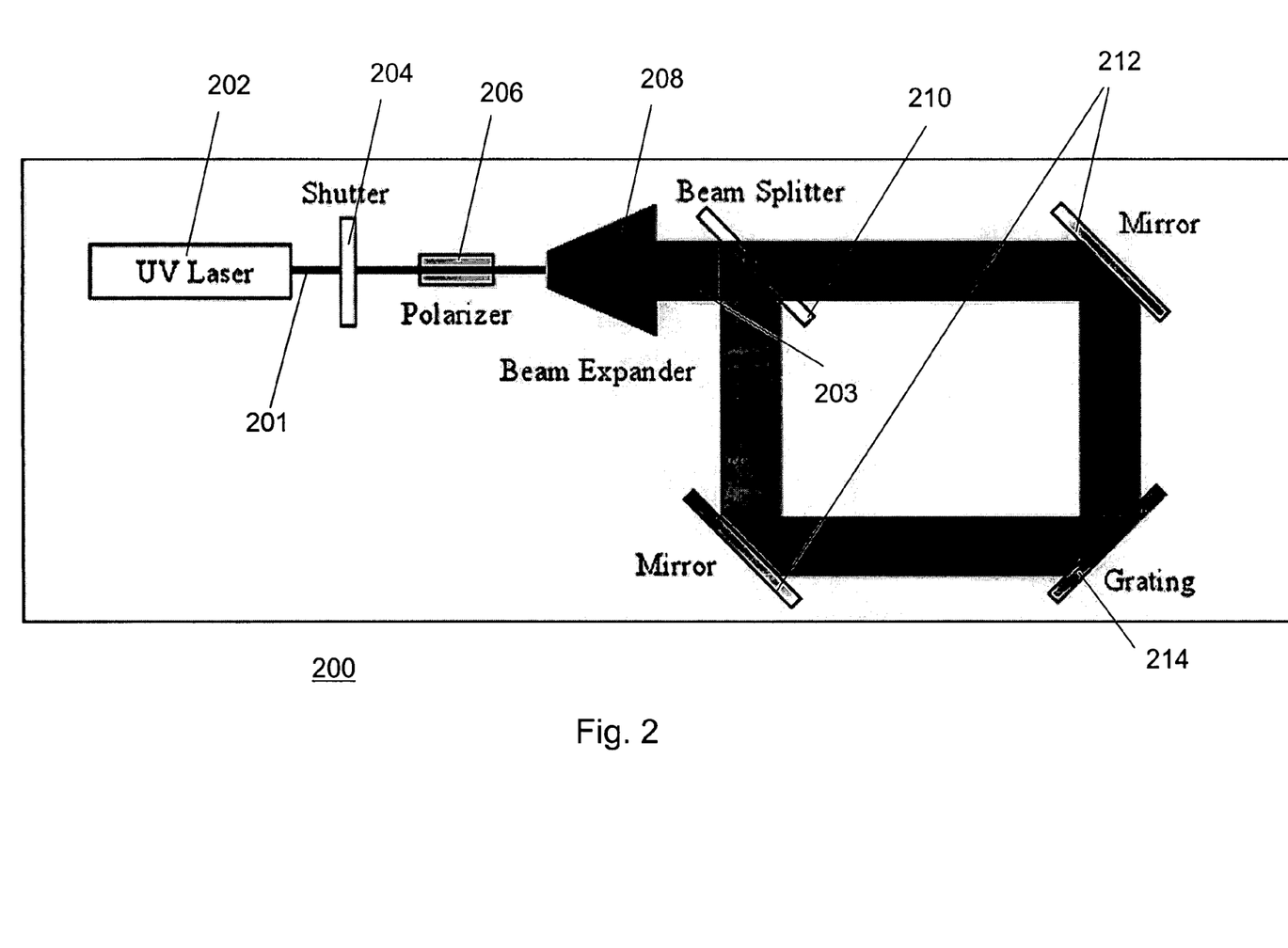
FIG. 2 shows a schematic of the optic experimental setup for fabrication of an HPDLC according to the embodiment, in which mirrors are mounted on rotation stages.

As shown in FIG. 2, the general fabrication apparatus 200 includes a UV laser 202 that emits a laser beam 201 of a wavelength of lower than about 400 nm. The laser beam 201 is controlled by a shutter 204, which opens or closes according to whether or not the presence of the laser beam 201 is desired. The shutter(s) 204 can be placed essentially anywhere along the path of the laser beam(s) before the beams impinge on the grating structure containing the liquid material 214. The laser beam 201 then impinges on a polarizer 206 and the polarized laser beam 201 is then incident on a beam expander 208. The beam expander 208 increases the radius of the laser beam 201 to form an expanded beam 203. Expanding the laser beam 201 permits the entire area of the grating structure 214 to be covered by the expanded laser beam 203 giving a column with cross-sectional area of about 100 cm$^2$ in one embodiment. The large exposure area brings additional benefits, such as more precise control over the power density of the exposure and thus loose fabrication tolerance and high efficiency. A beam splitter 210 then splits the expanded laser beam 203 into two mutually coherent beams, which are then directed by mirrors 212 onto the grating structure 214. The two beams may or may not be identical. High quality front-surface mirrors may be used. A typical laser power used to produce the present HPDLC structures is about 10 mW to about 500 mW when the wavelength is in the UV region. Typical curing times for the present HPDLC structures are about 1 second to about 300 seconds.

Figure 3:
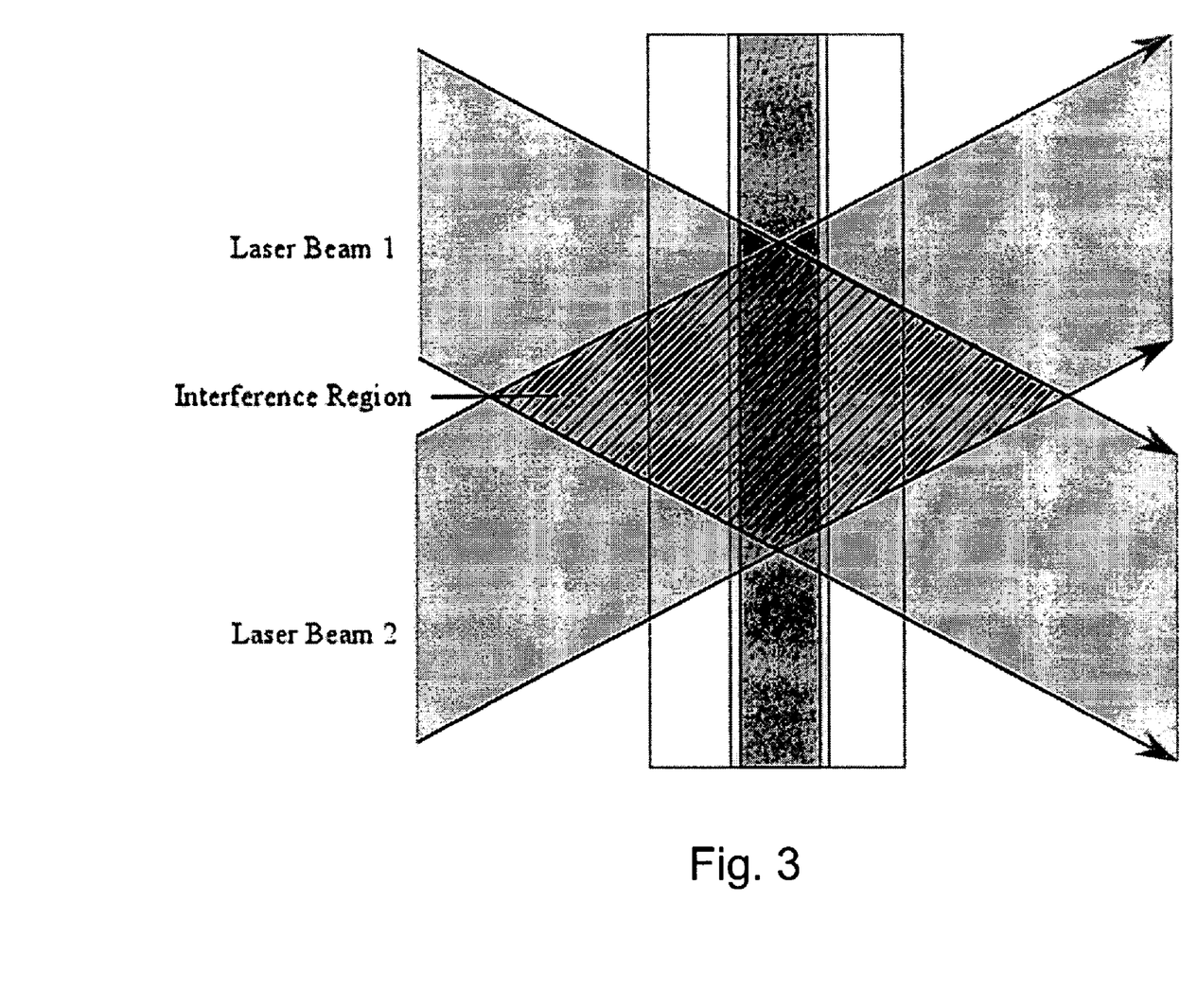
FIG. 3 shows a close up view of the crossing area of the split beams on the grating structure of FIG. 2.

The Bragg grating 214 is formed through the interference between the split expanded laser beams 203 at the crossing area of the beams. A close up of the object beam and reference beam impinging on the crossing area is shown in FIG. 3. The diffraction grating 214 is a result of the interference pattern produced by the interaction of the polarized beams in the photopolymer dispersed in the liquid crystal. When the photopolymer is exposed to the interference pattern it itself is patterned in a like manner so that in effect the interference pattern is embedded in the cell.

More specifically, the polymer syrup cell, containing homogeneous mix of liquid crystals and monomers and/or oligomers, as well as photo-initiators and surfactants, is put in the center of interference area. During the recording process, the photopolymers polymerize and the mixture undergoes a phase separation, creating regions densely populated by liquid crystal droplets, interspersed with regions of clear polymer. This is to say that, the electrically switchable gratings are formed by a microphase separation of small-molecule liquid crystals from a polymerizing organic matrix with a holographically defined periodic pattern. The polymerization is initiated by photo exposure in the high light intensity areas of the interference pattern. The term liquid crystal droplet refers merely to an aggregate of liquid crystals rather than a particular shape such as a teardrop or spherical shape.

The interference of the two plane waves in the medium can be described as a sum of two electric fields. The optical intensity (square of field amplitude) is quadrupled in the high light intensity areas. This is to say that the intensity is $4I_o$ when constructive interference occurs and the intensity is zero when destructive interference occurs. Thus, constructive interference occurs when the wave amplitudes add to produce a maximum in the high light intensity areas), and destructive interference occurs when the wave amplitudes cancel each other to produce a minimum in the low light intensity areas.

In the high light intensity areas, the monomers begin linking with one another to form polymer chains. There is little polymerization at the low light intensity areas. Other monomers or oligomers diffuse into these bright regions to link up with the rapidly forming polymers chains. Simultaneously, the liquid crystal diffuses to the low light intensity areas, which saturate and precipitate droplets that grow in size as the diffusion process continues. A time shutter is used to remotely control exposure time. When the diffusion process has reached an appropriate stage, the whole mixture is flooded with uniform light to completely surround the liquid crystal droplets with fully cured polymer matrix, resulting in a solid grating layer. The alternating liquid crystal-rich and liquid crystal-depleted regions form the fringe planes of the grating. Typical sources of the uniform light include lasers or conventional UV lights.

The Bragg grating exhibits very high diffraction efficiency, which is then controlled by the magnitude of the electric field applied across the HPDLC layer. The clouds of droplets are "seen" as a homogenous region with an effective index ($n_{LCM}$) different from that of the interspersed polymer regions ($n_p$). The refractive index modulation is $\Delta n = n_{LCM} - n_p$. The basic parameters are shown in the examples of FIGS. 4(*a*) and 4(*b*): grating period $\Lambda$ (also called grating pitch), refractive index modulation, slant angle $\Phi$, and grating vector K, which will be described later.

Figure 5A:
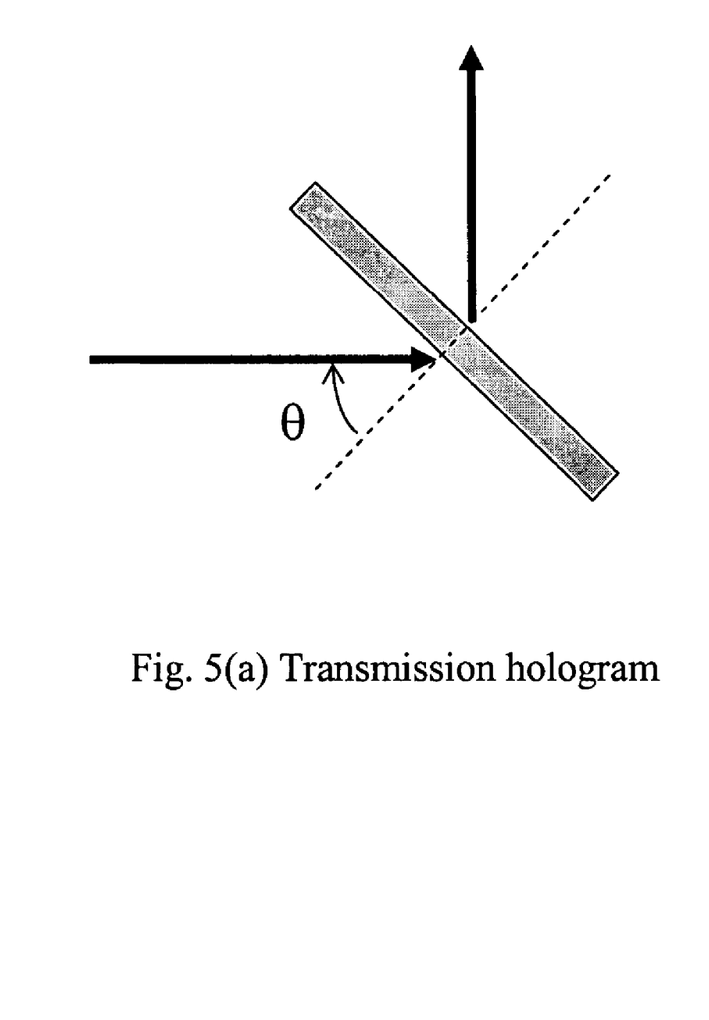
Figure 5B:
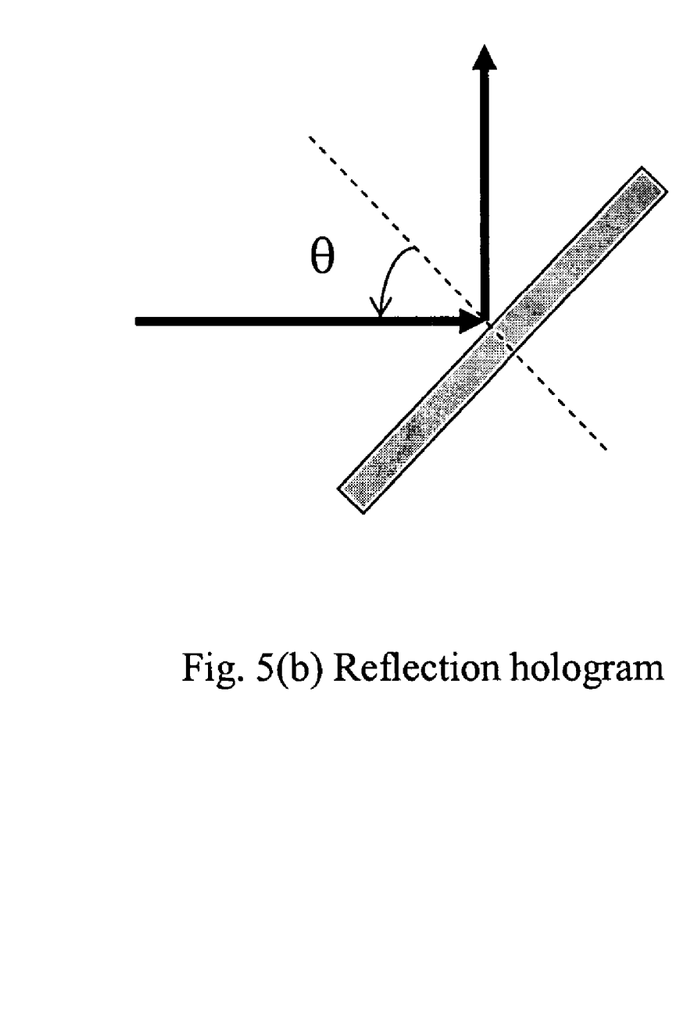

The HPDLCs created may be categorized into two types: transmission holograms and reflection holograms, which are illustrated in FIGS. 5(*a*) and 5(*b*), respectively. For a transmission grating, the incident and diffracted beams are disposed at opposite sides of the grating. For a reflection grating, the incident and diffracted beams are disposed on the same side of the grating.

Unlike conventional gratings, the refractive index modulation $\Delta n = n_{LCM} - n_p$ can be varied based on the electro-optic effect. In other words, the liquid crystals within the droplets can respond to the application of an external electric field via the electrodes. With the application of an external field, HPDLC gratings can switch between two states as the directors of the liquid crystal molecule align with the electric field. The natural orientation of the liquid crystal droplets is changed from a random orientation when no electric field is applied to being aligned with an applied electric field. In one state, the droplets and the polymer matrix have the same refractive index ($n_p = n_{LCM}$) and the whole composite looks like a uniform material with a single refractive index. In the other state, where the liquid crystal rich region and matrix differ in refractive index by $\Delta n = n_{LCM} - n_p$, the whole composites exhibits a well-defined grating.

Although the grating is shown as containing a single layer of material that includes polymerized photopolymers and liquid crystal aggregates, multiple layers containing different materials may be used. Such layers may contain either or both different polymerized photopolymers and liquid crystal aggregates, each of which may be formed from materials and/or compositions different from one or more of the other layers.

Figure 6A:
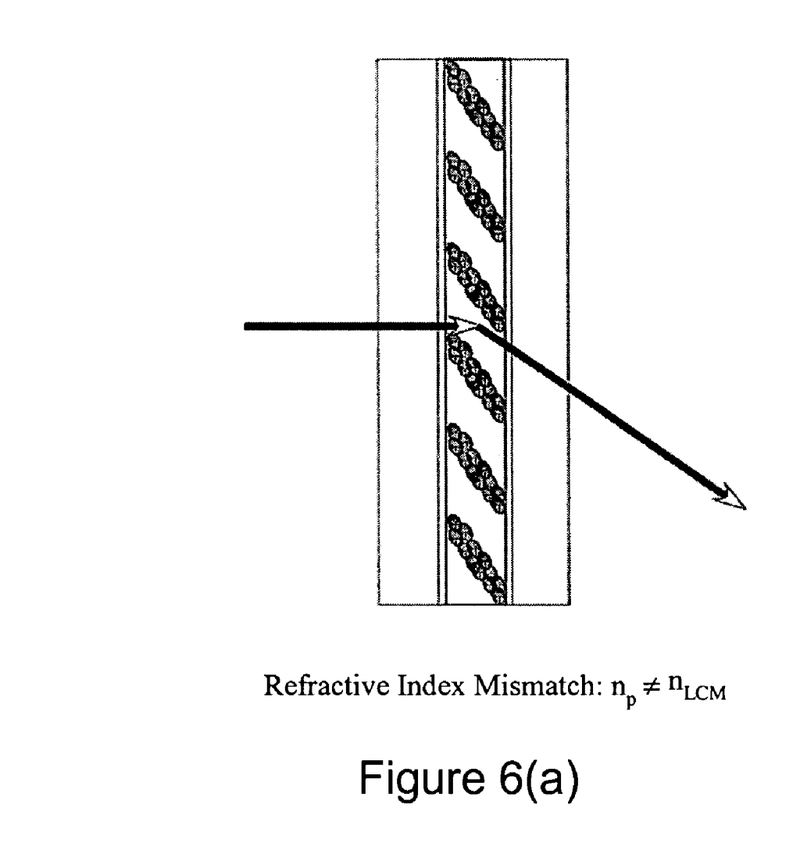
FIGS. 6(a) and 6(b) show a conventional optical switch with different voltages applied.
Figure 6B:
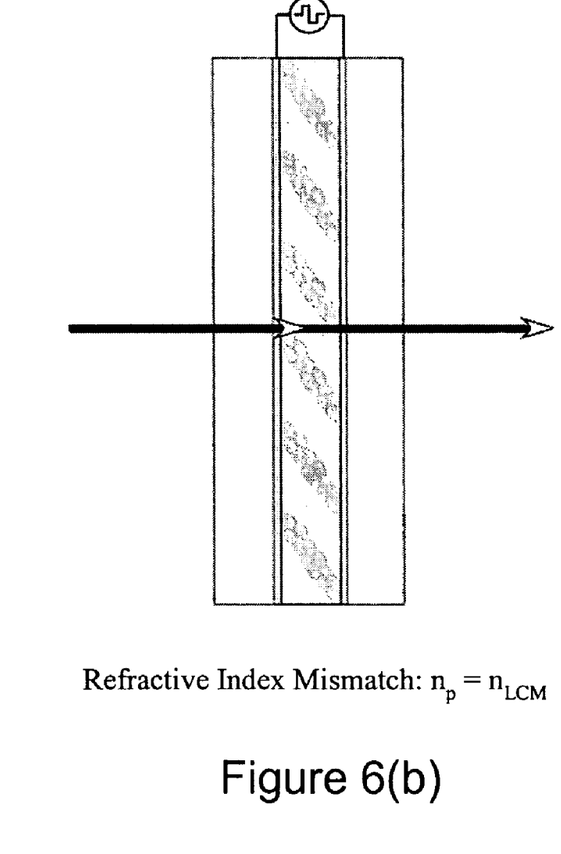
Figure 7A:
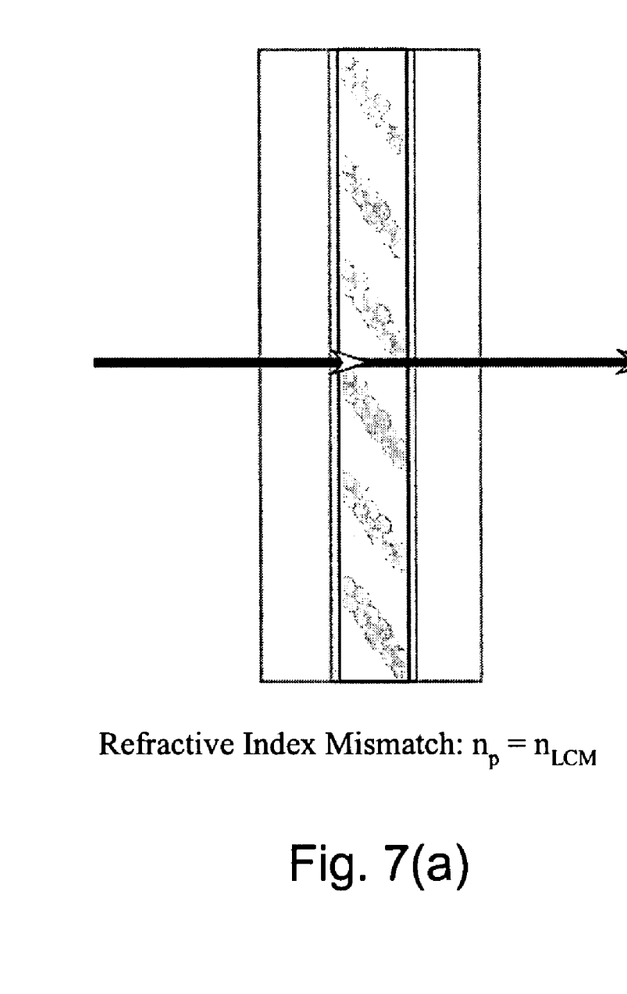
FIGS. 7(a) and 7(b) show an optical switch according to an embodiment of the present invention with different voltages applied.
Figure 7B:
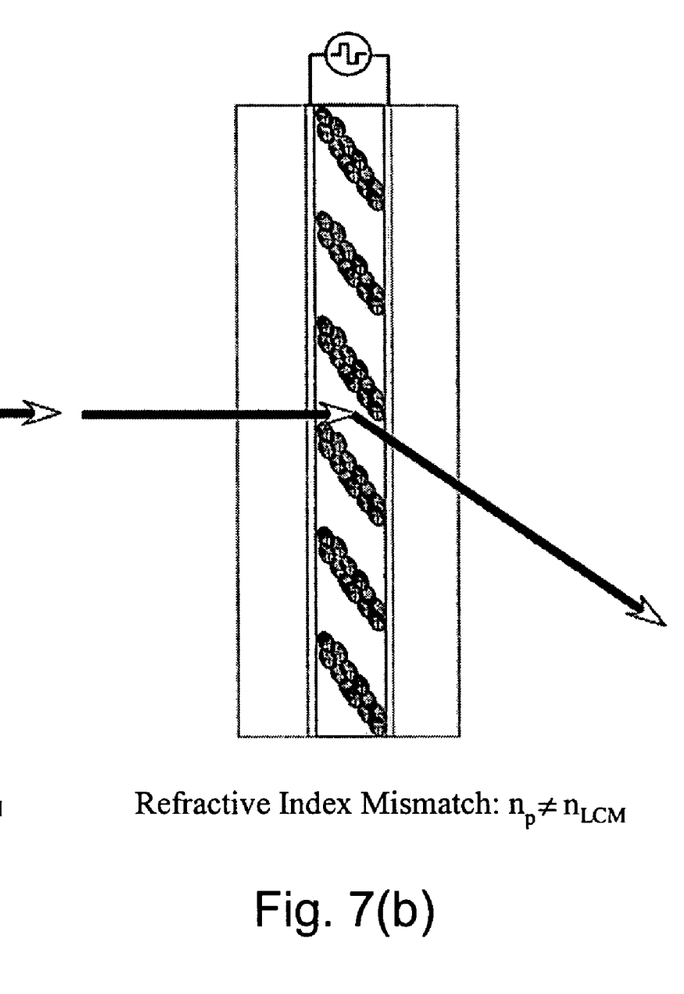

In HPDLC gratings, as shown in FIGS. 6 and 7, the grating can switch between two states as the liquid crystal molecule align with application of an external electric field. In one state, the droplets and the polymer matrix have the same refractive index ($n_p = n_{LCM}$) and the whole composite looks like a uniform material with a single refractive index. In the other state, where the liquid crystal rich region and matrix differ in refractive index by $\Delta n = n_{LCM} - n_p$, the whole composite exhibits a well-defined grating.

In a conventional HPDLC, the refractive index of the liquid crystal droplets having an orientation perpendicular to LC-polymer interface is different from that of the polymer regions, thereby causing a modulation in the refractive index of the structure. As an electric field is applied, the liquid crystal droplets become uniformly oriented in the same direction and, the indices of refraction of the liquid crystal droplets and polymer regions eventually become equal. In other words, the refractive index of the polymer regions and the average index of the liquid crystal droplets are matched only when a specific non-zero electric field is applied to the structure (hereinafter called the maximal voltage). Thus, the application of a voltage to the electrodes causes the refractive index modulation of the fringes to reduce and the hologram diffraction efficiency to drop to very low levels, or, in other words, the light impinging on the device is essentially completely transmitted through the device when the maximal voltage is applied across the electrodes, as shown in FIGS. 6(a) and 6(b).

In particular, an electrically switchable grating is basically a volume phase grating with diffraction properties well predicted using Kogelnik model. The diffraction properties can be modeled by assuming an index modulation given by:

$$n = n_0 + n_1 \cos(K \cdot r) \quad (1)$$

where $n_0$ is the average refractive index, K is the grating vector, and r is a position coordinate. In Equation (1), $n_1$ is the index modulation amplitude given by:

$$n_1 = (2f_c/\pi)(n_{LCM} - n_p)\sin(\alpha\pi) \quad (2)$$

where $f_c$ is the volume fraction of phase-separated liquid crystal in the grating, $n_p$ is the polymer index, $n_{LCM}$ is the average index of liquid crystal droplets, and $\alpha$ is the fraction of grating period $\Lambda$ occupied by the liquid crystal droplets. For in-line reflection grating, the equations of diffraction efficiency for TE and TM polarizations are identical to that predicted by Kogelnik as well, given as, $$R = \tan h^2[\pi n_1 d/\lambda], \quad (3)$$

where R is the peak reflection, d is the grating length, $\lambda$ is the Bragg wavelength, and $n_1 = n_p + f(n_{LCM} - n_p)$.

One parameter influencing the performance characteristics is the refractive index modulation. The refractive index modulation typically ranges from 0.01 to 0.2 for achieving high diffraction efficiency (about 100%). The HPDLC cell thickness (interaction length) is in the range from 1 to 25 microns. An optimized fabrication process uses a balanced rate of diffusion and polymerization.

Based on the application requirements, different film thicknesses can be designed and then disposed on the substrate of interest for grating recording. For reflection gratings, the passband width of the filter may be calculated according to following equation:

$$\text{Passband } \Delta = \frac{3.9\lambda}{\pi T \gamma} \quad (4)$$

where $\lambda$ is the recording wavelength, and $\gamma$ is the spatial frequency of the recording interferometric gratings, and T is the film's thickness. Thus, for a recording wavelength and spatial frequency of approximately equal magnitudes and a film thickness of about 4 μm, the passband frequency is about 300 nm, broad enough to pass light from an LED without substantial attenuation.

However, unlike the conventional HPDLC gratings, using careful selection of the grating components in the present HPDLC optical switch, the refractive index of the polymer regions can be matched to the average index of the liquid crystal droplets without the application of an external electric field across the matrix. Thus, the refractive index modulation of the fringes and the hologram diffraction efficiency are minimized when no voltage is applied to the electrodes and are maximized when the maximal voltage is applied across the electrodes. This is shown in FIGS. 7(a) and 7(b).

Moreover, as both the grating structure and liquid crystal droplets are polarization sensitive, by adjustment of the grating geometry and structural engineering, the polarization sensitivities may be compensated. For example, the grating structure is picked to get close diffraction angle for both polarizations, and then the materials are chosen to compensate. In one embodiment, a polymer having a relatively high refractive index and the ability to polymerize well is selected before the liquid crystal material is chosen. Relatively high refractive index polymers used here have a refractive index of larger than about 1.55, and preferably larger than about 1.58. The relatively high index of refraction of the polymerized photopolymer is sufficient to match the effective refractive index of the liquid crystal aggregates when the electrodes have the same potential. Cholesteric liquid crystals are generally selected for the optical switch rather than nematic liquid crystals due to the polarization-insensitive refractive index.

Specifically, because the elongated shape of liquid crystals enables light to propagate at a different speed parallel to the elongated direction of the molecules, compared with the propagation of light perpendicular to the elongated molecules, the birefringence of the molecules means that two indices of refraction describe this behavior. Nematic liquid crystals, which are arranged with parallel but not lateral order and thus have a constant director, cannot be used alone as the index of refraction is dependent on the focus of the major axis ae. Cholesteric liquid crystals, on the other hand, are arranged at a slight angle relative to each other (rather than parallel as in the nematic). Each consecutive molecule is rotated slightly relative to the adjacent molecule, thereby having a director that rotates helically and causing the index of refraction to be dependent on the average of the focus of the major axis and semi-major axes (2 ao+ae)/3. However, as noted below, adding chiral dopants to the nematic liquid crystals to twist the director of the nematic liquid crystals may permit the combination to be used.

Photopolymers with different refractive index were formulated from many different commercially available monomers, oligomers, photo-initiators, and optionally adhesion promoters, surfactants etc. As the photopolymerization kinetics directly affect the phase separation of liquid crystals from the polymer matrix, one consideration is using a photopolymer formulation with reasonable curing speed. In this regard, acrylate photopolymers may be preferred since they have superior curing speed compared to other photopolymers such as epoxies and vinyl ethers. High refractive index monomers and/or oligomers useful for this invention may comprise one or sulfinur elements, bromine elements, or bisphenol A derivatives.

Two examples of photopolymers are given below. The components of the polymers are given and then the weight percentage is provided after each component.

Photopolymer 1: 2-Ethylhexyl acrylate 52%, Ethoxylated bisphenol A diacrylate 2%, polyester tetraacrylate 17%, Phenylthioethyl acrylate 10%, Octafluoropentyl acrylate 16%, Diphenyl(2,4,6-trimethylbenzoyl)phosphine oxide 1%, Daracure 1173 1%, Methacryoyl trimethoxysilane 1%.

Photopolymer 2: Ethoxylated bisphenol A diacrylate 16.5%, Phenylthioethyl acrylate 64.5%, Octafluoropentyl acrylate 16%, Diphenyl(2,4,6-trimethylbenzoyl)phosphine oxide 1%, Daracure 1173 1%, Methacryoyl trimethoxysilane 1%.

Many different commercially available Cholesteric liquid crystals are suited for making HPDLC devices. Merck offers a broad range of Cholesteric liquid crystals for HPDLC applications which may be used in the present HPDLC device when combined with the right photopolymers.

Examples of commercially available Cholesteric liquid crystals are Merck BL112, BL118 or BL126, available from EM Industries of Hawthorne, N.Y. Adding chiral dopants into nematic liquid crystals can also make Cholesteric liquid crystals. Examples of chiral dopants are Merck C15, CB15, ZLI-811, ZLI 3786, ZLI-4571, ZLI-4572, MLC-6247, and MLC-6248, also available from EM Industries of Hawthorne, N.Y. HPDLC syrups were obtained by mixing the photopolymer formulations with liquid crystals. The liquid crystal level as a weight percentage of the total syrup range from about 35-75%, and more particularly from about 45-60%.

Materials formulations and performance data are listed below in Table 1 where example 1 is a traditional HPDLC cell and example 2 is a traditional HPDLC cell based on commercially available Cholesteric liquid crystals BL 118. Example 3 is a HPDLC cell of the present application based on commercially available BL118. The light source was a 460 nm laser for the measurements.

TABLE 1

Examples of HPDLC samples and the resulting diffraction characteristics

| Examples | Photopolymer | Syrup | DE (V = 0) | DE when maximal voltage is applied |
|---|---|---|---|---|
| 1 | Photopolymer 1 | 50% Photopolymer 1 50% BL087 | 4 um thick cell: P: 97% S: 13% | 4 um thick cell at 40 V: P: 1.0% S: 3.5% |
| 2 | Photopolymer 1 | 50% Photopolymer 1 50% BL 118 | 6 um thick cell: P: 57% S: 45% | 6 um thick cell at 50 V: p: 1.8% s: 7.9% |
| 3 | Photopolymer 2 | 50% Photopolymer 2 34% BL118 16% 18523 | 6 um thick cell: P: 1.0% S: 3.0% | 6 um thick cell at 80 V: P: 30% S: 28% |

As shown in Table 1, using the third syrup, a simple holographic optical switch may be obtained without increasing the cost of materials or fabrication from conventional HPDLC gratings. The third syrup contains two types of liquid crystals of different weight percentages, although more could be used and the weight percentages equal, as desired. The holographic cell is 6 μm thick and exhibits substantially uniform transmission and diffraction for both the S and P polarizations at the same voltage. Note that as the thickness of the grating is reduced, the index of refraction increases, resulting in a larger usable wavelength range. Thicknesses of as low as about 2 to about 4 μm permit sufficient wavelength ranges (see Equation (4)) to be used.

Figure 9B:
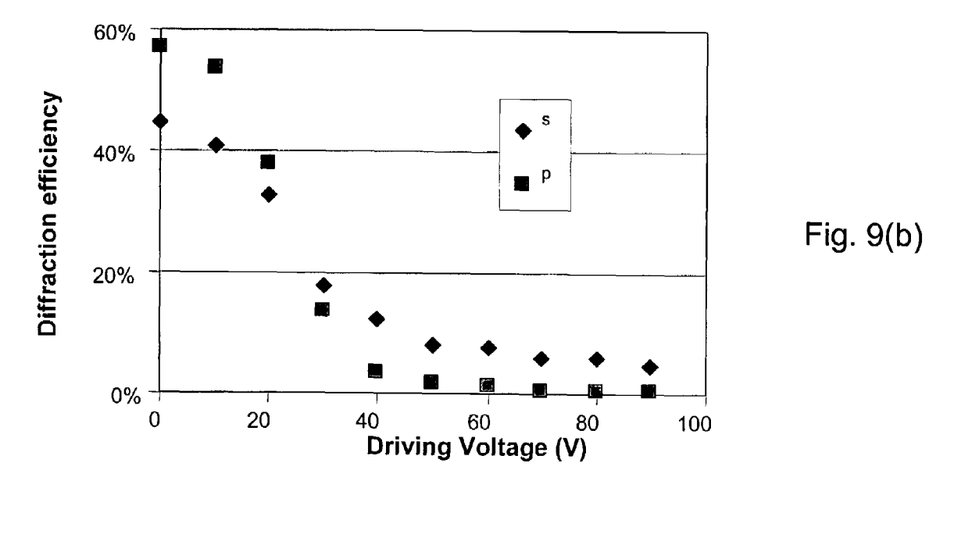
Figure 9C:
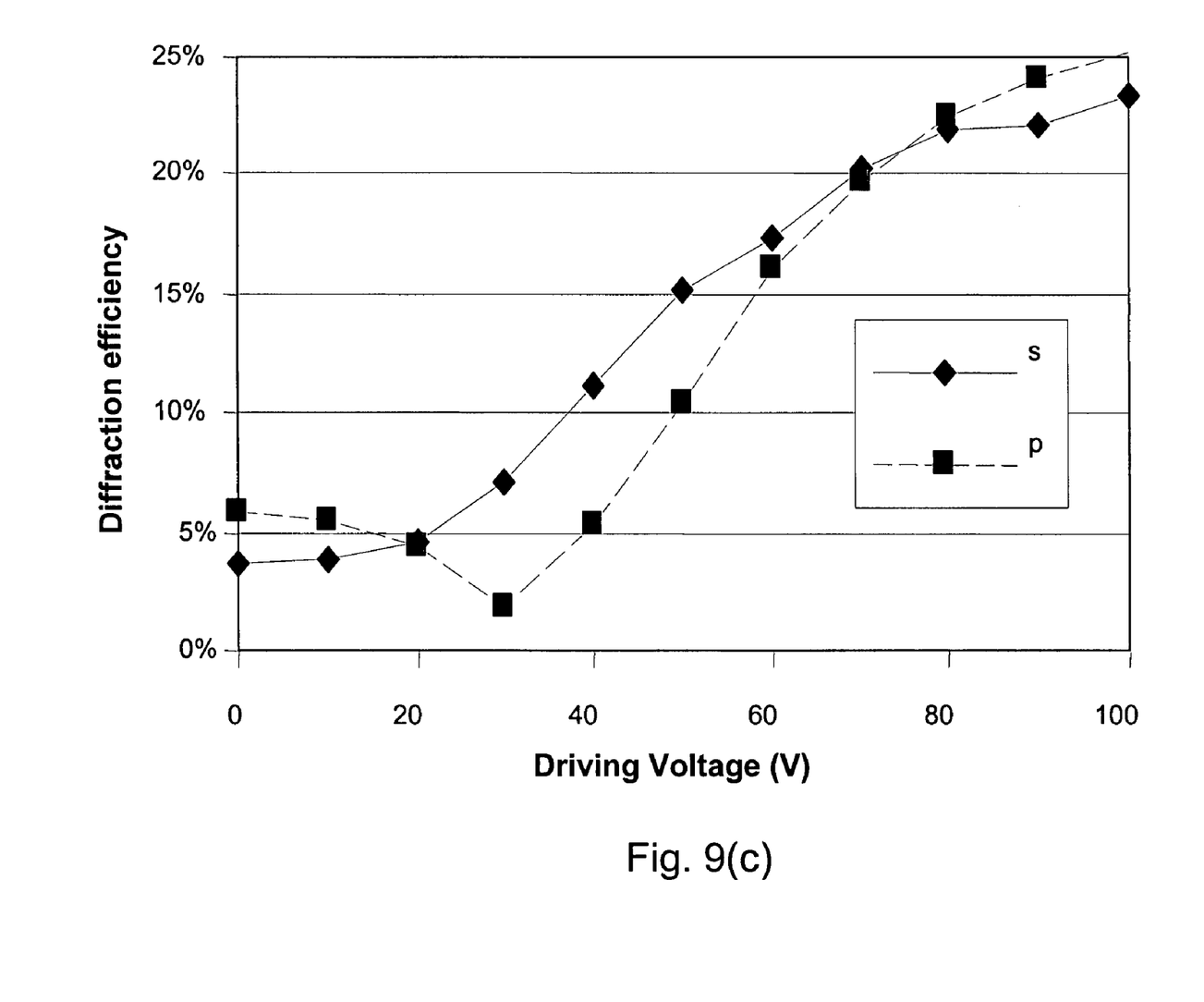

The diffraction efficiency as a function of applied voltage of an HPDLC of Example 2 (in which chiral agents are added) is shown in FIG. 9(b). FIG. 9(a) shows Example 1. As can be seen, the diffraction efficiency for both s and p polarized light of laser light at 442 nm is somewhat the same. Like the conventional HPDLC shown in FIG. 9(a), the diffraction efficiency essentially monotomically decreases with increasing voltage. The diffraction efficiency of a HPDLC of Example 3 is shown in FIG. 9(c). In this HPDLC, the response of the grating is independent of the polarization of the incident light. As seen, the diffraction efficiency for s and p polarized laser light at 442 nm is substantially the same. Unlike the conventional HPDLC shown in FIG. 9(a) or 9(b), the diffraction efficiency essentially increases from about 5% at 0V to about 25% at 100 V (i.e. the transmission efficiency decreases from about 95% to about 75%).

Figure 8A:
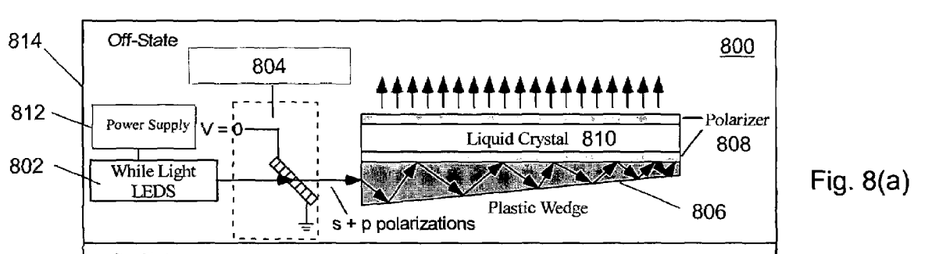
FIGS. 8(a) and 8(b) show an LCD according to an embodiment of the present invention with different voltages applied.
Figure 8B:
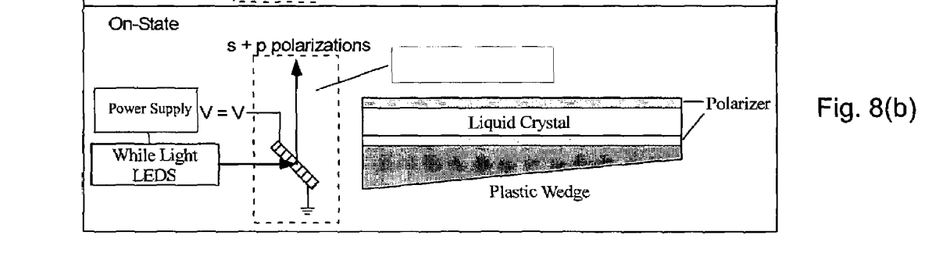

FIGS. 8(a) and 8(b) illustrate an LCD display in one embodiment without a voltage applied to the optical switch and with the maximal voltage applied. Specifically, the LCD display 800 contains a light source 802. The light source 802 may be any backlight used in LCD displays, such as an LED, EL or fluorescent lamp. LEDs are generally used as they are efficient in terms of power and size. The use of a wideband light source, such as a white LED, covers at least about 400 to 800 nm, i.e. the visible wavelength regime. This permits a color LCD to be used (color filters are present but not shown in the figures) and simultaneous allows white light to be used externally if desired. Either single LEDs such as red, blue, or green LEDs, or combinations of LEDs may be used. If a blue (or perhaps green) LED is used, phosphor may be disposed on one or more surfaces of the optical switch, or inside the optical switch, to absorb the light and emit light with other colors such as yellow. In this case, the LED light passes through the polymer matrix and liquid crystal droplets, either being transmitted or diffracted, before impinging upon the phosphor. The gratings may be designed to transmit and/or diffract from about 190 nm to about 2 μm.

Light from the LED 802 impinges on the holographic optical switch 804 disposed adjacent to the LED 802. A reflector, focusing lens or housing (not shown) of some type can surround the LED 802 and reflect or focus light from the LED 802 directed away from the holographic optical switch 804 back towards the holographic optical switch 804. The light from the LED 802 is transmitted through the holographic optical switch 804 when no voltage exists between the electrodes of the holographic optical switch 804 (the OFF state) and is diffracted when the voltage is applied between the electrodes of the holographic optical switch 804 (the ON state). When in the ON state, the diffracted light does not impinge on the LCD. Although not shown, the non-diffracted light, if it exists, can be transmitted to the LCD for display or other purposes.

The LED 802 and holographic optical switch 804 are laterally aligned with a light guide 806 of the LCD such that light transmitted through the holographic optical switch 804 is transmitted towards the light guide 806 and at least some of this light eventually impinges on the light guide 806. In other words, at least a portion of the LED 802, holographic optical switch 804, and light guide 806 are substantially planar with each other. The arrangements shown in FIG. 8 permit easy coupling of light into the LCD. The light guide 806 may be formed from plastic or any other material used in LCDs and may be formed using any known light guide structure. Although the LED 802 and LCD are shown as being separate, they may be attached to each other. Light entering the light guide 806 enters the LCD panel from the underside of the LCD panel in contact with the top of the light guide 806. As shown, light in the light guide 806 may be reflected numerous times before being completely introduced to the LCD panel.

The LCD panel includes polarizers 808, a liquid crystal layer 810 and numerous other known layers not shown. These layers include, but are not limited to, transparent substrates on which the polarizers 808 are disposed and between which the liquid crystal layer 810 is disposed, transparent and reflective electrodes that serve to apply an electric field to the liquid crystal layer 810 for example, layers to form and protect thin film transistors, and color filter layers that divide unit cells of the LCD into pixels of multiple colors (usually red, green, blue and perhaps white).

A power supply 812 such as a battery is contained within the LCD display 800. The power supply 812 provides power to the LED 802, the electrical driver of the optical switch 804 (thereby supplying voltage across the electrodes of the optical switch) and the LCD panel. This power supply may be adjustable to vary the voltage supplied, e.g. to vary the electric field in across the grating. Alternatively, power may be supplied to the various components of the LCD display 800 through an external supply. The LCD display 800 or other portable electronic device also contains a casing (or housing) 814 that encloses the LED 802, the optical switch 804 and the LCD among other components of the LCD display 800. The casing 814 has a viewing portion (not shown) that permits the LCD to be viewed by a user and a lighting portion (not shown) through which the diffracted light exits the casing 814 to the outside. This is to say that the light from the optical switch is directed to illuminate outside the casing. Although not shown, a lens can be added within the casing 814 and/or at the lighting portion of the casing 814 to collimate or focus the diffracted light within the casing 814 and/or outside of the casing 814.

Thus, as shown, the light source 802, optical switch 804 and liquid crystal display are arranged such that when a potential difference between the electrodes of the optical switch is substantially different from zero, light from the light source 802 in the optical switch is directed substantially away from the liquid crystal display. In other words, to manufacture the arrangement, the angle of the optical switch is adjusted such that when non-zero voltage at which the light from the light source is maximally refracted is applied to the optical switch, the light from the light source that has exited from the optical switch is directed adjacent to the liquid crystal panel without impinging on the liquid crystal panel.

Also, multiple gratings may be disposed between the light source and the light guide panel. These gratings may be wholly physically separate optical switches with different properties or may be multiple layers that are integrated either side-by-side or in a thickness direction in the same optical switch. If the optical switches are separate, the physical position of the grating and other grating characteristics including physical tilt angles or spatial frequencies, for example, can be different. The materials used in the HPDLC layers may be the same or different if the optical switches are separate or may be different if the layers are integrated into a single optical switch. This permits one or more beams of light to be deflected to different positions, if desired. No matter whether the optical switches are separate or integrated, either the same or different voltages may be applied to the HPDLC layers. For example, in an integrated optical switch, one or more of the transparent electrodes may be connected at different potentials using, say, voltage dividers.

In addition, although only one light source is shown, multiple light sources may be used. These light sources may impinge on the same grating or different gratings, interact with the same or different light guides, and may be disposed adjacent to each other, on the same side of the liquid crystal display, or on opposing sides of the liquid crystal display.

Thus, in one aspect, the liquid crystal display device includes a liquid crystal display, a light source, and the optical switch. The liquid crystal display has opposing substrates, electrodes on the substrates, a liquid crystal layer between the electrodes, polarizers disposed on opposite sides of the substrates as the liquid crystal layer, and a light guide disposed on one of the polarizers. The optical switch is disposed between the light guide and the light source. In addition, the optical switch contains opposing optical switch substrates, optical switch electrodes disposed between the optical switch substrates, and a diffraction grating disposed between the electrodes. This diffraction grating includes regions of a polymerized photopolymer having a refractive index and liquid crystal aggregates having an effective refractive index substantially the same as the refractive index of the polymerized photopolymer when the electrodes have the same potential. A power supply is connected to the electrodes of the optical switch. The grating may be substantially polarization independent.

The light source, optical switch and liquid crystal display may be arranged such that when substantially no potential difference exists between the electrodes of the optical switch, light from the light source is transmitted through the optical switch towards the light guide. Similarly, the light source, optical switch and liquid crystal display may be arranged such that when a potential difference between the electrodes of the optical switch is substantially different from zero, light from the light source in the optical switch is directed substantially away from the liquid crystal display. In general, at least a portion of the light source and light guide are planar with each other.

It is therefore intended that the foregoing detailed description be regarded as illustrative rather than limiting, and that it be understood that it is the following claims, including all equivalents, that are intended to define the spirit and scope of this invention. Nor is anything in the foregoing description intended to disavow scope of the invention as claimed or any equivalents thereof. For example, other uses of the low power optical switch may exist, such as for other optical systems or electronic ink (e-ink) uses.

We claim:

1. An optical switch comprising:
opposing substrates;
electrodes disposed between the substrates; and
a diffraction grating disposed between the electrodes, the diffraction grating containing regions of a polymerized photopolymer having a refractive index and liquid crystal aggregates having an effective refractive index that is substantially equal to the refractive index of the photopolymer when the electrodes have the same potential, wherein the optical switch is disposed between a light guide and a light source of a liquid crystal display device.

2. The optical switch of claim 1, wherein the effective refractive index of the liquid crystal aggregates is tunable by applying a voltage between the opposing substrates.

3. The optical switch of claim 1, wherein the grating is substantially polarization independent.

4. The optical switch of claim 1, wherein the grating is designed to transmit light with a wavelength of about 190 nm to about 2 μm.

5. The optical switch of claim 1, wherein the grating is tunable to diffract light with a wavelength of about 190 nm to about 2 μm by applying an electrical field between the electrodes.

6. The optical switch of claim 1, wherein the grating is designed to switch light from a light emitting diode (LED).

7. The optical switch of claim 6, wherein the LED is a blue LED.

8. The optical switch of claim 1, further comprising phosphor disposed on one or more surfaces of the optical switch, or inside the optical switch, to absorb light impinging thereon and emit light of at least one other color.

9. The optical switch of claim 1, wherein the photopolymer comprises one or more monomers, oligomers, or photoinitiators.

10. The optical switch of claim 9, wherein the photopolymer further comprises one or more of surfactants, adhesion promoters or stabilizers.

11. The optical switch of claim 1, wherein the polymerized photopolymer has a relatively high index of refraction sufficient to match the effective refractive index of the liquid crystal aggregates when the electrodes have the same potential.

12. The optical switch of claim 11, wherein the photopolymer comprises one or more of monomers or oligomers that have a high refractive index.

13. The optical switch of claim 12, wherein the one or more of monomers and oligomers comprise one or more of: sulfur elements, bromine elements, or bisphenol A derivatives.

14. The optical switch of claim 1, wherein the polymerized photopolymer has a refractive index higher than about 1.55.

15. The optical switch of claim 1, wherein the liquid crystal aggregates comprise at least one cholesteric liquid crystal.

16. The optical switch of claim 15, wherein the photopolymer comprises one or more of monomers or oligomers that have a high refractive index.

17. The optical switch of claim 13, wherein the one or more of monomers and oligomers comprise one or more of: sulfur elements, bromine elements, or bisphenol A derivatives.

18. The optical switch of claim 15, wherein the liquid crystal aggregates are formed from at least two different cholesteric liquid crystals of different weight percentages.

19. The optical switch of claim 1, wherein a refractive index modulation of the liquid crystal aggregates is substantially the same for both the p and s polarizations of light impinging on the diffraction grating.

20. The optical switch of claim 1, wherein the liquid crystal aggregates comprise at least one chiral dopant.

21. The optical switch of claim 1, wherein a single layer containing the polymerized photopolymers and liquid crystal aggregates is present in the grating.

22. The optical switch of claim 1, wherein a plurality of layers containing the polymerized photopolymers and liquid crystal aggregates is present in the grating.

23. The optical switch of claim 1, wherein a weight percentage of the liquid crystal aggregates with respect to a total weight of the liquid crystal aggregates and polymerized photopolymers is 35 to 75%.

24. The optical switch of claim 23, wherein the weight percentage is 45 to 60%.

25. An optical switch comprising:
opposing substrates;
electrodes disposed between the substrates; and
a diffraction grating disposed between the electrodes, the diffraction grating containing regions of a polymerized photopolymer having a refractive index and liquid crystal aggregates having an effective refractive index that is substantially equal to the refractive index of the photopolymer when the electrodes have the same potential, and a refractive index modulation of the liquid crystal aggregates is substantially the same for both the p and s polarizations of light impinging on the diffraction grating, wherein the optical switch is disposed between a light guide and a light source of a liquid crystal display device.

26. The optical switch of claim 25, wherein the effective refractive index of the liquid crystal aggregates is tunable by applying a voltage between the opposing substrates.

27. The optical switch of claim 25, wherein the grating is designed to transmit light with a wavelength of about 190 nm to about 2 µm.

28. The optical switch of claim 25, wherein the grating is tunable to diffract light with a wavelength of about 190 nm to about 2 µm by applying an electrical field between the electrodes.

29. The optical switch of claim 25, wherein the polymerized photopolymer has a relatively high index of refraction sufficient to match the effective refractive index of the liquid crystal aggregates when the electrodes have the same potential.

30. The optical switch of claim 25, wherein the polymerized photopolymer has a refractive index higher than 1.55.

31. The optical switch of claim 25, wherein the liquid crystal aggregates comprise at least one cholesteric liquid crystal.

32. The optical switch of claim 25, wherein the liquid crystal aggregates comprise at least one chiral dopant.

33. The optical switch of claim 25, wherein a single layer containing the polymerized photopolymers and liquid crystal aggregates is present in the grating.

34. The optical switch of claim 25, wherein a plurality of layers containing the polymerized photopolymers and liquid crystal aggregates is present in the grating.

35. The optical switch of claim 25, wherein a weight percentage of the liquid crystal aggregates with respect to a total weight of the liquid crystal aggregates and polymerized photopolymers is 35 to 75%.

* * * * *